Nov. 12, 1963 H. J. KROL ETAL 3,110,774
MULTIPLE POSITION ROTARY SWITCH
Filed June 8, 1960 3 Sheets-Sheet 1

INVENTORS
Harry J. Krol
BY Leland C. Hoy
Ooms, McDougall, Williams & Hersh
Attorneys Nov. 12, 1963 H. J. KROL ETAL 3,110,774
MULTIPLE POSITION ROTARY SWITCH
Filed June 8, 1960 3 Sheets-Sheet 2

INVENTORS
Harry J. Krol
BY Leland C. Hoy
Ooms, McDougall, Williams & Hersh
Attorneys INVENTORS
Harry J. Krol
Leland C. Hoy
BY Ooms, McDougall, Williams & Hersh
Attorneys

United States Patent Office 3,110,774
Patented Nov. 12, 1963

3,110,774
MULTIPLE POSITION ROTARY SWITCH
Harry J. Krol, Arlington Heights, and Leland C. Hoy, Skokie, Ill., assignors to Indak Manufacturing Corporation, Northbrook, Ill., a corporation of Illinois
Filed June 8, 1960, Ser. No. 34,702
1 Claim. (Cl. 200—11)

This invention relates to electrical switches, and pertains particularly to a rotary switch which is adjustable to a number of different positions.

One object of the present invention is to provide a new and improved switch having a bridging contactor which may be used with four or more contact points, and which is so arranged that good contact between the contactor and each of the contact points is assured.

No particular problem of maintaining substantially uniform contact pressure is involved in switches in which a bridging contactor is movable into engagement with two or three contact points. In such switches, a single spring may be employed to bias the contactor against the contact points. The contactor is loosely mounted so as to be free to rock to a certain extent. When only two or three contact points are employed, the contactor automatically rocks to such a position that the contact pressure between the contactor and the points will be equalized. Then, switches of this type are substantially self-equalizing with respect to contact pressure. However, when four or more contact points are employed, it becomes difficult to obtain equalized contact pressure, because the contactor may rest primarily against three of the contact points, with very little or no contact pressure between the contactor and the other point or points.

The present invention provides an arrangement whereby four or more contact points may be employed, with automatic assurance that the contact pressure between the contactor and the desired contact points will be equalized.

A further object is to provide a new and improved multiple position switch having four or more contact points which are adapted to be engaged by a bridging contactor having two or three segments, which are mounted on an insulating member, but are raised slightly above the surface of the member, the arrangement of the segments being such that the contactor will engage only two or three of the contact points in any one position of the switch, with the result that the pressure between the contactor and the contact points will automatically be equalized.

Another object is to provide a new and improved switch of the foregoing character, in which air gaps are provided between the edges of the contactor segments and the insulating support, so as to minimize the effect of arcing as the contactor segments move over the contact points, while also preventing any arcing from burning or carbonizing the insulating support.

A further object is to provide a new and improved switch of the foregoing character which is remarkably easy to manufacture and low in cost.

Further objects and advantages of the present invention will appear from the following description, taken with the accompanying drawings, in which.

Figure 1:
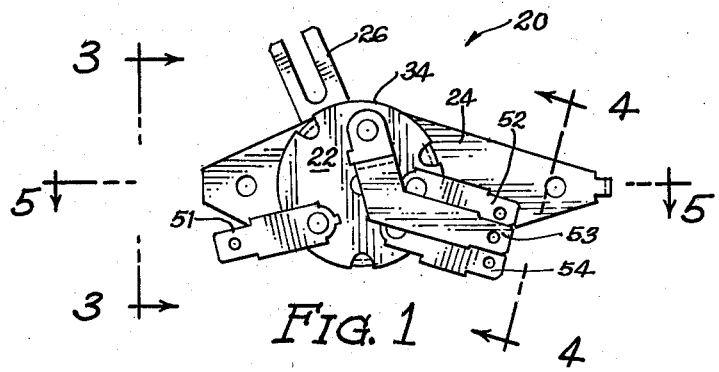
FIG. 1 is a rear elevational view of a rotary switch to be described as an illustrative embodiment of the present invention.
Figure 2:
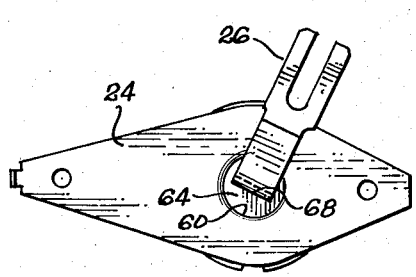
FIG. 2 is a front elevational view of the switch shown in FIG. 1.
Figures 3, 4:
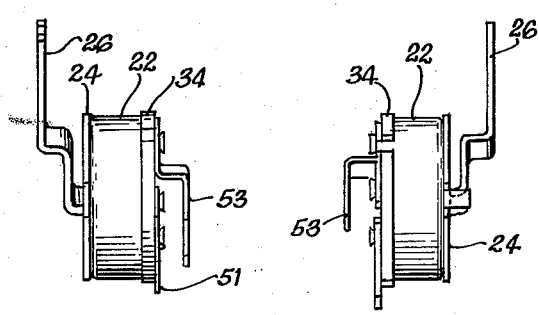

FIGS. 3 and 4 are side elevational views, taken generally as indicated by the lines 3—3 and 4—4 in FIG. 1.

Figure 5:
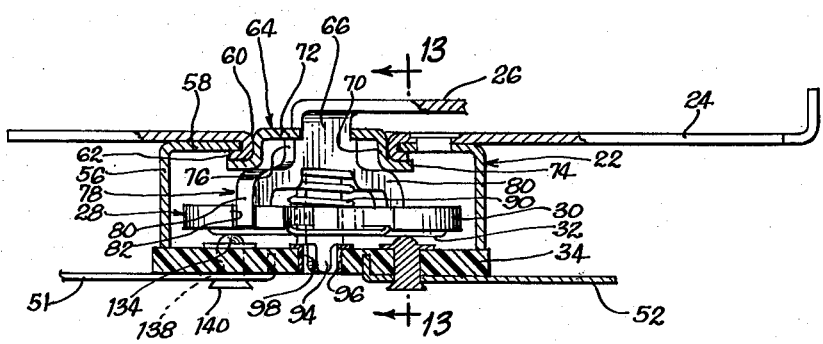

FIG. 5 is an enlarged sectional view, taken generally along the line 5—5 in FIG. 1.

Figure 6:
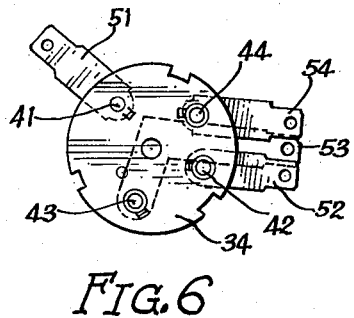

FIG. 6 is an elevational view showing the front side of the contact supporting disk for the switch, on which the four contact points of the switch are mounted.

Figure 7:
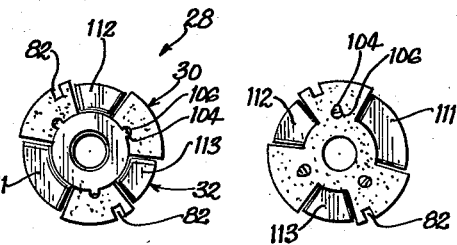

FIG. 7 is an elevational view showing the rearwardly facing, contact-engaging side of the rotary contactor assembly employed in the switch.

Figure 8:
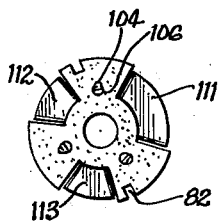

FIG. 8 is an elevational view showing the opposite side of the rotary contactor assembly.

Figure 9:
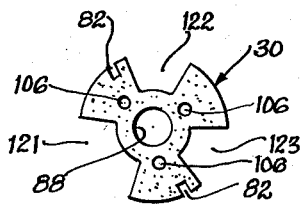

FIG. 9 is an elevational view showing the insulating member employed as part of the rotary contactor assembly.

Figure 10:
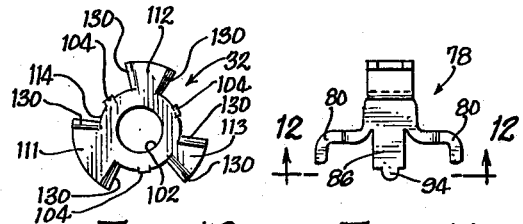

FIG. 10 is an elevational view showing the conductive bridging member which constitutes the contactor proper, adapted to be mounted on the insulating support of FIG. 9.

Figure 11:
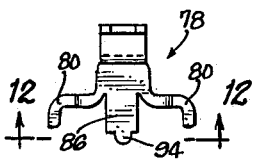

FIG. 11 is a side elevational view of the combined switch-operating arm and spider on which the rotary contactor assembly is carried.

Figure 12:
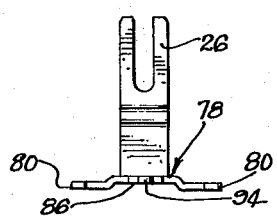

FIG. 12 is a rear view of the combined arm and spider, taken generally as indicated by the line 12—12 in FIG. 11.

Figure 13:
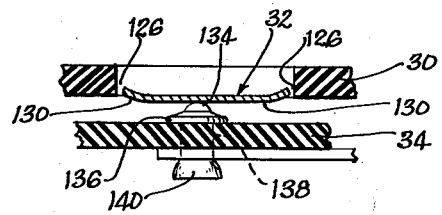

FIG. 13 is a considerably enlarged fragmentary sectional view, taken generally along a line 13—13 in FIG. 5, to show various details of the contactor and contact construction.

Figure 14:
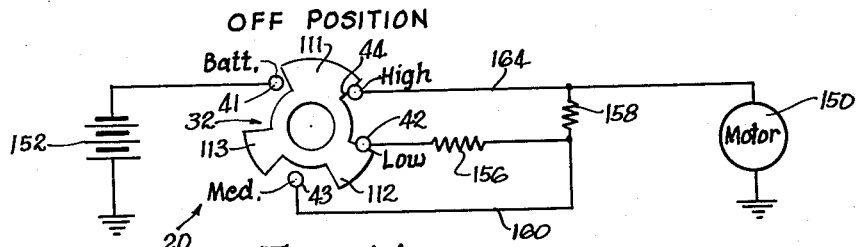

FIG. 14 is a diagrammatic view illustrating the position of the contactor, relative to the contact points, in the off position of the switch.

Figure 15:
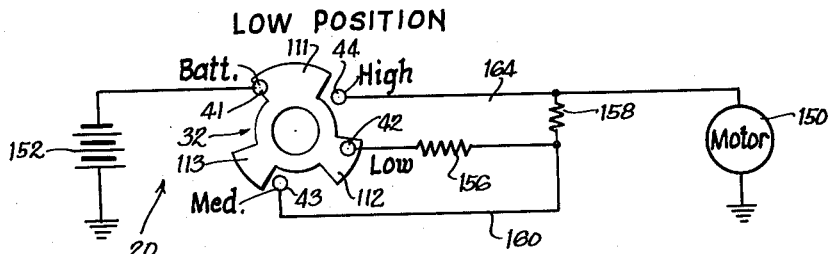
Figure 16:
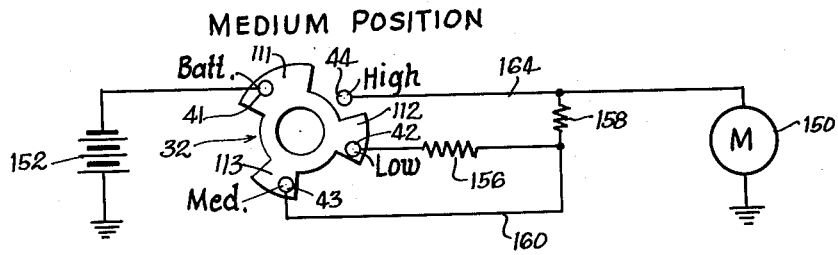
Figure 17:
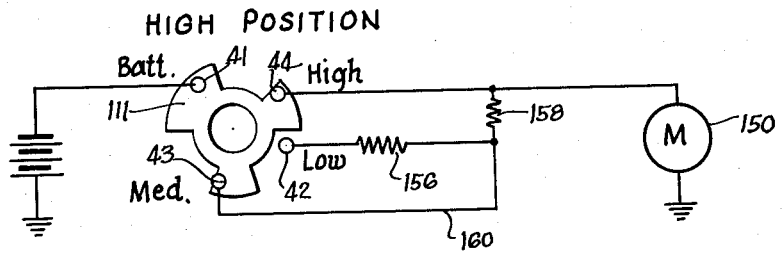

FIGS. 15, 16 and 17 are diagrammatic views which are similar to FIG. 14, except that the contactor is shown in three successive arm positions, which, for example, may constitute the low, medium and high speed setting of the switch, when it is employed to control a heater motor or other device.

As just indicated, the drawings illustrate a rotary switch 20 which will find numerous applications. For example, it may be employed as a control switch for an automotive heater or the like. The illustrated switch has four positions, including an off position and three on positions, for low, medium and high speed operation of the heater motor or other device.

As shown, the switch 20 comprises a housing 22 which is fitted with a mounting bracket 24, whereby the switch may be mounted under the dashboard of an automobile, or in any other desired position. It will be seen that the switch 20 has a rotatable operating arm or lever 26 which is adjustable to a plurality of positions corresponding to the various positions of the switch.

The illustrated switch 20 has a rotatable contactor assembly 28 which is mounted within the housing 22. The contactor assembly 28 comprises an insulating member or support 30 which is connected to the operating arm 26 so as to be rotatable therewith. A conductive contactor 32 is mounted on the insulating support 30 and is engageable with a plurality of contacts which are mounted on an insulating back plate or disk 34. In this case, there are four such contacts 41, 42, 43 and 44. The contacts 41–44 extend through the insulating back plate 34 and are connected to lugs or terminals 51, 52, 53 and 54.

The illustrated housing 22 is generally cup-shaped, in that it comprises a generally cylindrical side wall 56 and a flat disk-like front wall 58. An opening 60 is formed in the center of the front wall 58. The illustrated mounting plate 24 has a central tubular flange 62 which extends through the opening 60 and is folded or crimped outwardly to secure the mounting plate 24 to the housing 22.

The inside of the flange 62 provides a bearing for a ferrule or bushing 64 which is rotatable with the operating arm 26. It will be seen that the arm 26 is bent outwardly in a generally radial direction from a flat shaft portion 66 which extends through a slot 68 in the ferrule 64.

As shown, the ferrule 64 comprises a cylindrical portion 70 which is rotatably received within the tubular flange 62. The slot 68 is formed in a front wall 72 which extends across the front of the cylindrical member 70. At its rear end, the cylindrical member 70 is formed with an outwardly turned generally radial flange 74 which is engageable with the end of the flange 62 so as to limit the forward movement of the ferrule. The flat shaft portion 66 has an enlarged member or shoulder 76 which is disposed immediately behind the front wall 72 and is too large to pass through the slot 68.

The rear end of the flat shaft 66 is formed into a spider 78 having two rearwardly projecting arms 80. It will be seen from FIG. 5 that the spider 78 is adapted to receive and locate the contact assembly 28. Thus, the insulating contactor support 30 has a pair of notches or slots 82 formed in the edge thereof and adapted to receive the rearwardly projecting arms 80. The slots 82 fit loosely over the arms 80 so that the contact assembly 28 will be free to slide from front to rear along the arms. It will be seen that the insulating support 30 is generally in the form of a flat disk. The notches 82 are formed at generally opposite points in the edge of the disk.

The flat shaft 66 has a rearwardly projecting portion 86 which extends through a central opening 88 in the insulating contactor support 30. In the illustrated construction, a coil spring 90 is received around the shaft portion 86 and is compressed between the spider 78 and the insulating member 30, so as to bias the contact assembly 28 in a rearward direction. This spring 90 maintains contact pressure between the contactor 32 and the contact points 41–44.

At its rear end, the illustrated shaft portion 86 has a reduced portion 94 which is fitted with a bushing 96. A central opening 98 is formed in the back plate 34 to receive the bushing 96. The bushing 96 is rotatable in the opening 98 so as to serve as a pilot or guide for the rear end of the shaft portion 86. Thus, the switch shaft 66 is supported at its front end by the rotatable ferrule 64, and at its rear end by the rotatable bushing 98.

The rotatable contactor 32 is of the bridging type, adapted to interconnect various combinations of the contact points 41–44. As shown, the contactor 32 is generally in the form of a metal disk mounted on the rear of the insulating contactor support 30. The contactor 32 has a central opening 102 which affords clearance for the shaft 86. The contactor 32 may be secured to the insulating member 30 by a plurality of prongs 104 which extend from the contactor through holes 106 in the insulating member 30. The rear ends of the prongs 104 may be bent over to retain them in place.

The illustrated contactor 32 has three segments 111, 112 and 113 which radiate outwardly from a central portion 114. Cutouts 122 and 123 are formed in the insulating member 30 behind the segments 111, 112 and 113. The cutouts 121, 122 and 123 are somewhat wider in angular extent than the corresponding segments 111, 112 and 113, so that narrow air gaps or slots 126 are formed between the edges of the segments and the corresponding edges of the cutouts. These air gaps control and limit the effect of the arcing between the contactor segments and the contact points. Moreover, the gaps prevent the insulating contactor segment from being burned or carbonized by any such arcing.

The contactor 32 is offset rearwardly from the insulating contact support 30, so that the rear faces of the segments 111, 112 and 113 project rearwardly beyond the rear face of the insulating member 30, as shown to advantage in FIGS. 5 and 13. The radial edges of the segments 111, 112 and 113 are bent or angled forwardly so as to form ramps or inclined elements 130 between the insulating member 30 and the segments. Each of the contact points 41–44 projects forwardly to a substantial extent from the insulating back plate 34 and is formed with a generally hemispherical nose portion 134 which is engageable with the segments 111–113. An enlarged head or shoulder 136 is formed on each contact point behind the nose portion 134, so as to engage the front side of the back plate 34. Each contact point has a shank portion 138 which extends through the insulating rear plate 34. The rear end of the shank portion 138 is upset to form a head 140 which retains the corresponding contact lug.

The rearwardly projecting arms 80 of the spider 78 may be disposed in a plane which is offset slightly from the axis of the shaft portion 86. The notches 82 in the insulating contactor support 30 may be correspondingly offset. With this arrangement, the rotatable contactor assembly 28 will fit in only one position on the spider 78.

In the case of a switch having four or more contact points, it is normally quite difficult to maintain uniform contact pressure between the rotary contactor and the individual contact points. However, in the present switch, this difficulty is completely overcome by arranging the contactor and the contact points so that no more than three of the contact points will engage the contactor at any one time. One factor in accomplishing this result is the arrangement and spacing of the contactor segments 111, 112 and 113 and the contact points 41, 42, 43 and 44. The contactor segments are arranged so that only three such segments are needed. The contact points are positioned so that no more than three of the contact points will engage the contactor in any one position of the switch.

Another important factor in this accomplishment resides in the manner in which the contactor segments 111, 112 and 113 are offset rearwardly from the insulating contactor support 30, as shown in FIG. 13. With this arrangement, only the contact points engaging the contactor segments are involved in the problem of contact pressure equalization. Any contact point which is opposite the insulating member 30 is spaced slightly therefrom so that there is no contact pressure at this point. Accordingly, the contact pressure is distributed only among the contact points which are engaging the contactor segments. It will be understood that the contact pressure is derived from the single spring 90, which biases the entire contactor assembly 28 rearwardly toward the contact points 41, 42, 43 and 44. The contact pressure is distributed between either two or three of the contact points, in the manner of a bipod or a tripod. Thus, contact pressure equalization is automatically assured.

Additional details of the operation of the switch will become clear from a consideration of FIGS. 14, 15, 16 and 17, which are diagrammatic views illustrating the four positions of the switch. The various views represent the following positions of the switch: FIG. 14, off; FIG. 15, low; FIG. 16, medium; FIG. 17, high.

In FIG. 14, the switch 20 is shown connected in the control circuit for a motor 150, which, for example, may be the blower motor of a heater in an automobile or the like. The heater control circuit is illustrated merely by way of example, because the switch is applicable to numerous control functions.

As shown, the contact point 41 is connected to one terminal of a battery 152, or some other source of power, the other terminal of the battery being grounded to the frame of the automobile. As it is customary, the frame serves as the return conductor from the motor to the battery. The contact point 41 may be characterized as the battery contact of the switch. The segment 111 is the widest of the contact segments and is adapted to engage the battery contact 41. Thus, the segment 111 may be termed the battery segment of the contactor 32.

In the off position of the switch, as shown in FIG. 14, the battery contact point 41 is not in engagement with any of the contactor segments 111, 112 and 113. Thus, no circuit is established to any of the contact points.

In the low position of the switch, as shown in FIG. 15, the contactor 32 has been rotated slightly in a counterclockwise direction, so that the contactor segment 111 engages the battery contact point 41. At the same time, the contactor segment 112 engages the contact point 42, which thus may be characterized as the "low" contact point. The other two contact points 43 and 44 are opposite the insulating contactor supporting member 30 and thus are not in engagement with the contactor. It will be apparent that the contact pressure is concentrated at the contact points 41 and 42, which engage the contactor. Thus, firm contact pressure at these active contact points is assured.

In the control circuit of FIGS. 14–17, the low position contact point 42 is connected to the motor 150 through two resistors 156 and 158 which are connected in series. The resistors 156 and 158 limit the current through the motor 150 and thus reduce its speed.

The switch may be moved to the medium position, as shown in FIG. 16, by turning the contactor 32 an additional amount in a counterclockwise direction, until the contactor segments 113 engages the medium position contact point 43. It will be seen that a lead 160 is connected between the contact point 43 and the junction of the resistors 156 and 158, so that only the resistor 158 is in the circuit between the contact point 43 and the motor 150. With this connection, the speed of the motor is increased, but is still limited by the resistor 158.

In the medium position of FIG. 16, the contact points 41, 42 and 43 engage the contactor segments 111, 112 and 113. The fourth contact point 44 is opposite the insulating member 30. Because of the rearwardly offset position of the contactor 32, as shown in FIG. 13, the contact point 44 is out of engagement with the insulating member 30. Thus, substantial equalization of the contact pressure between the contactor 32 and the three contact points 41, 42 and 43 is assured.

In the high position of FIG. 17, the contactor 32 has been turned still farther in a counterclockwise direction, so that the contactor segment 112 engages the high position contact point 44. It will be seen that a lead 164 is connected directly between the contact point 44 and the motor 150, so that the switch establishes a direct circuit between the battery 152 and the motor 150. In this case, the three contact points 41, 43 and 44 engage the contactor 32, while the contact point 42 is opposite the insulating member 30. Accordingly, substantially uniform distribution of the contact pressure among the contact points 41, 43 and 44 is assured.

In the medium position of the switch, as shown in FIG. 16, the contactor 32 engages the low contact point 42, as well as the medium contact point 43, but this is of no consequence, because the lead 160 bypasses the resistor 156 in any event. Similarly, in the high speed position of the switch the contactor 32 engages the medium contact point 43, in addition to the high contact point 44, but the lead 164 bypasses the resistor 158, so that the engagement with the contact point 43 is of no consequence.

It will be apparent that the present invention assures the adequate distribution of contact pressure between the rotary contactor and the contact points, even though the switch employs four contact points. Of course, the present invention is also applicable to switches utilizing more than four contact points. With all of its advantages, the switches of the present invention are remarkably easy to manufacture and low in cost.

Various modifications, alternative constructions and equivalents may be employed without departing from the true spirit and scope of the present invention, as exemplified in the foregoing description, and defined in the following claim.

We claim:

In a rotary switch, the combination comprising a stationary insulating plate, a plurality of contact points mounted on said plate and projecting forwardly therefrom, a rotatable insulating plate positioned in front of said contact points, means for rotating said rotatable insulating plate, a contactor plate mounted on the rear side of said rotatable insulating plate and having a plurality of contact segments engageable with said contact points, and spring means urging said rotatable insulating plate rearwardly to produce contact pressure between said contactor plate and said contact points, said contact segments being offset rearwardly from the rear surface of said rotatable insulating plate to provide for adequate distribution of contact pressure among the contact points engaging said contactor, said rotatable insulating plate having segmental cutouts opposite said contact segments and corresponding generally in shape thereto, said segments having radial edge portions angled forwardly to form ramps recessed into said cutouts, said cutouts being substantially wider in angular extent than the corresponding contact segments to produce slots between said ramps on said segments and said rotatable insulating plate at the radial edges of said cutouts, said slots being effective to control and limit any arcing between said contact segments and said contact points.

References Cited in the file of this patent

UNITED STATES PATENTS

| | | |
|---|---|---|
| 1,921,766 | Meuer | Aug. 8, 1933 |
| 2,459,998 | Ellithorpe | Jan. 25, 1949 |
| 2,682,783 | Lawson | July 6, 1954 |
| 2,804,512 | Elliott et al. | Aug. 27, 1957 |
| 2,928,916 | Bonanno | Mar. 15, 1960 |

FOREIGN PATENTS

| | | |
|---|---|---|
| 466,598 | Canada | July 11, 1950 |
| 541,545 | Italy | Apr. 4, 1956 |